May 26, 1964 R. L. GLENN ETAL 3,134,491
STORAGE BIN UNLOADING APPARATUS
Filed Sept. 14, 1962 2 Sheets-Sheet 1

INVENTORS.
Richard L. Glenn
Richard A. O'Dell
BY
Scofield, Kokjer, Scofield & Lowe
ATTORNEYS.

May 26, 1964   R. L. GLENN ETAL   3,134,491
STORAGE BIN UNLOADING APPARATUS
Filed Sept. 14, 1962   2 Sheets-Sheet 2

INVENTORS.
Richard L. Glenn
Richard A. O'Dell
BY
Scofield, Kokjer, Scofield & Lowe
ATTORNEYS.

United States Patent Office 3,134,491
Patented May 26, 1964

3,134,491
STORAGE BIN UNLOADING APPARATUS
Richard L. Glenn, Prairie Village, Kans., and Richard A. O'Dell, Independence, Mo., assignors to Butler Manufacturing Company, a corporation of Missouri
Filed Sept. 14, 1962, Ser. No. 223,704
10 Claims. (Cl. 214—17)

This invention relates generally to the unloading of pulverulent or particulate materials, particularly grains, from storage bins, and refers more particularly to the combination with a sweep auger of means operating to control the rate of sweep and descent of the sweep auger in the material to obtain a substantially constant flow rate with a minimum of horsepower.

In many grain storage bins in use today the bin is provided with a flat floor having a central opening into a discharge hopper or sump. A subfloor conveyor, usually in the form of an auger turning in a tube, communicates at one end with the sump or hopper and at the other end provides a discharge to a point exterior of the bin. In unloading filled bins of this type the bulk of the material can be moved simply by energizing the subfloor conveyor. Material will flow by gravity into the sump or hopper as the subfloor conveyor removes the contents therefrom. However, eventually a point is reached at which, because of the natural angle of repose of the material, gravity flow will cease. At this point, the material still in the bin assumes the form of an annular ring around the sump and extending to the side wall, the depth of the ring increasing toward the side walls to present a generally conical upper surface. From this condition on it is necessary to provide a means of conveying the retained material to the sump. Sometimes this is accomplished by manual means, such as shoveling; in other cases, interior sweep augers have been suggested or provided.

One major difficulty with sweep augers of which we have knowledge is that it is difficult to effectively control the rate of delivery by the sweep auger to the discharge sump, or hopper. In one instance the auger may swing too rapidly, riding over the top of the material and drawing the material inwardly toward the sump at a rate too fast for the capacity of the subfloor conveyor. In another, the auger submerges itself deeply into the material. In both cases undesirable flooding of the sump or hopper and interference with the sweep auger drive will occur. Moreover, excessive submergence tends to overload the sweep auger drive, or alternatively, require motors of substantially greater horsepower than can be provided in a marketable product.

Another difficulty attendant upon the use of free swinging lightweight augers which tend to ride over the grain mass is that the number of sweeps required to remove the material is such as to necessitate the use of swivel connections in the electric lines to the auger drive.

One of the important objects of the present invention is to provide an arrangement by which the operation of a sweep auger is so controlled as to remedy the difficulties set forth above, and which at the same time makes it possible to effect substantially complete unloading of flat bottom storage bins with ease and facility.

Another object of the invention is to provide an arrangement which permits the use of an auger which is unshielded throughout its length and which requires no special backup or guard plates to maintain effective delivery of the material. We rely upon the cooperation between the auger flighting and the material itself to provide the necessary confinement of material between the flights to achieve effective conveying capacity.

Another object of the invention is to provide means which, in combination with a sweep auger, serves to provide adequate and substantially constant conveying rates with a low power requirement.

Still another object of the invention is to provide means for accomplishing the objectives hereinbefore set forth at low cost, and which can be manufactured and assembled with ease and facility.

Other and further objects of the invention together with the features of novelty appurtenant thereto will appear in the course of the following description.

In the accompanying drawings which form a part of the specification and are to be read in conjunction therewith and in which like reference numerals indicate like parts in the various views.

Figure 1:
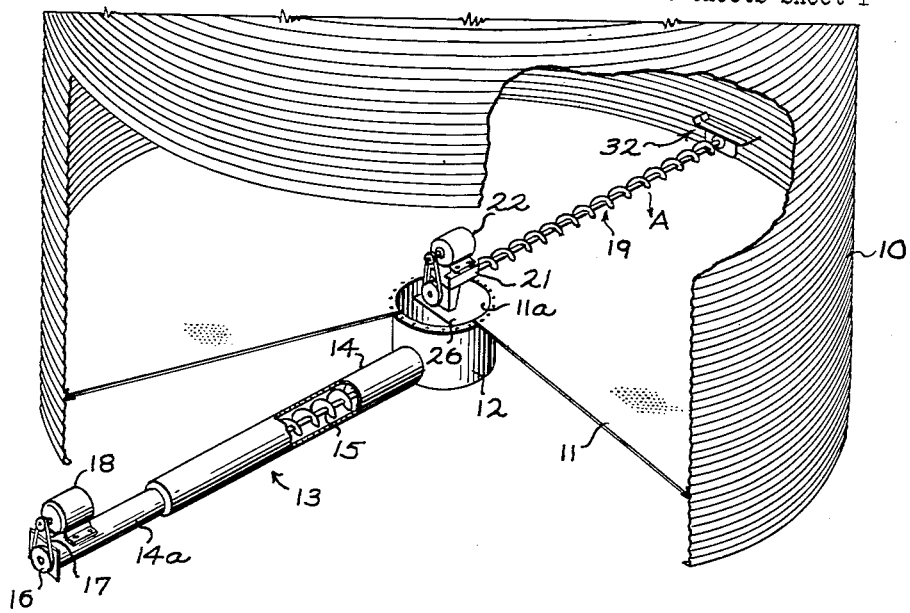
FIG. 1 is a perspective view of the lower portion of a typical grain storage bin, a portion of the wall and floor of which has been broken away, and in which is mounted a sweep auger apparatus embodying the invention.
Figure 3:
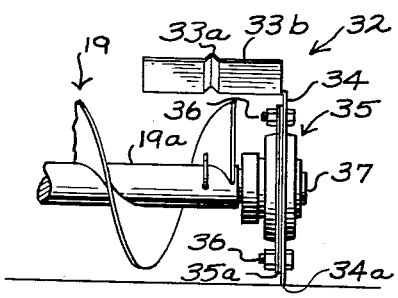
FIG. 3 is an enlarged fragmentary front elevation of the outer end of the sweep auger.

Referring now to the drawings and initially to FIG. 1, reference number 10 notes generally the side wall of a typical cylindrical grain storage bin having the floor 11. The floor may be of the perforated type, which permits forced air circulation through the grain (not shown), or solid. In the center of floor 11 is located an opening 11a which communicates with a sump or hopper 12. A subfloor conveyor 13 is connected laterally with hopper 12 and comprises a tube 14 containing an auger 15. Auger 15 extends at one end into the hopper 12 and at the other has a pulley 16 connected by belt 17 with a drive motor 18. While not shown, it will be understood that the outer tube section 14a is cut away on the bottom to provide an opening through which material can be discharged therefrom.

Figure 2:
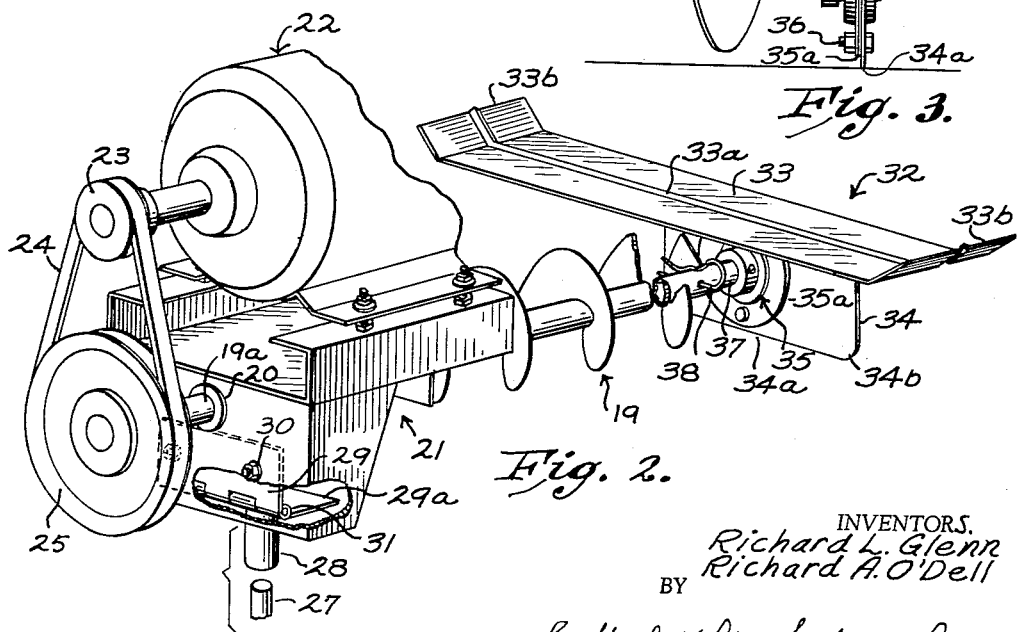
FIG. 2 is an enlarged perspective view of the complete sweep auger, parts being broken away for purposes of illustration and to indicate length.

The sweep auger which is located inside the bin includes the conventional screw or auger 19 which is of such length that when mounted to its pivot support (to be subsequently described) and parallel with the floor, the outer end lies adjacent, but spaced slightly inwardly from, the inside surface of the bin wall 10. As best seen in FIG. 2, the inner end of the auger shaft 19a is journaled in the bearing 20 carried by a motor mount 21. The motor 22 is connected with the top of mount 21 and drives a pulley 23. Pulley 23 is drivingly connected through belt 24 with a pulley 25 secured to the projecting end of the auger shaft.

Referring again briefly to FIG. 1, extending across the inside of the hopper 12 and rigidly supported therein, as by connecting the ends with the side walls by welding or bolts, is a cross brace or bracket 26. This bracket has at its midpoint an upstanding pin 27 (see FIG. 2). The pin 27 serves as a pivot mounting for a sleeve-like socket 28 connected with motor mount 21. The socket 28 is connected with the motor mount by a hinge structure having leaf 29 secured to the mounting by bolt 30 and the extending swingable leaf 29a hinged to leaf 29 by hinge pin 31. The socket is rigidly secured, as by welding, to the underside of leaf 29a.

At the outer end of the auger 19 is located the sled member 32, now to be described. The main body of the sled member comprises the substantially flat rectangular sheet or web 33, which is preferably formed from light gauge sheet metal. This web is provided with a central lengthwise corrugation 33a providing a reinforcement rib. At the opposed ends, tips 33b are turned upwardly and outwardly, the angle of inclination being approximately 45°. While we have shown the tips as having a relatively sharp break, they may be smoothly curved instead; the break is easier to manufacture.

The web portion 33 is normally disposed above the auger and is spaced therefrom sufficiently as to permit free turning of the auger therebelow. The web is connected with the auger by means of a downwardly bent plate portion 34 formed integral with and at one edge of portion 33. The plate portion 34 is apertured to receive a ball-bearing unit 35; the bearing has the ring flange 35a secured to plate 34 by bolts 36. A stub axle 37 is rotatably carried by the bearing and this axle extends telescopically into a corresponding end bore in the auger shaft 19a and is pinned therein by transverse snap pin 38. It will thus be evident that auger 19 is freely rotatable relative to the sled member 32.

It will be noted that the vertical plate portion 34 of the sled extends well below the auger shaft and terminates in a lower edge 34a which is parallel with the upper web portion 33a. The length of edge portion 34a is substantially greater than the diameter of the auger. For reasons which will subsequently be stated, the corners 34b at the ends of edge 34a are gently rounded, and the edge 34a is spaced from the axis of the auger a distance slightly greater than the over-all radius of the auger.

It will be helpful at this point to proceed with a general description of the manner of operation of the invention. In such description reference will be made to FIGS. 4, 5 and 6. First, however, it should be understood that normally the sweep auger unit will not be installed in the bin until the bin has been unloaded by the subfloor conveyor 13 to the point where no further gravity flow into hopper 12 takes place. As previously noted, gravity flow ceases at a time when there is still a substantial quantity of material in the bin. This material is self-supporting in a ring-like mass which increases in depth outwardly from around the hopper to the side wall of the bin, presenting a generally conical upper surface whose angle is determined by the angle of repose of the material.

When the material ceases to flow by natural causes, the sweep auger unit is then installed. This is done by introducing the unit to the interior of the bin. The socket 28 is seated downwardly on the upstanding pin 27 to provide a pivotal support for the unit, permitting pivoting about the center axis of the bin, as well as in a vertical plane about the hinge pin 31. The auger 19 extends outwardly therefrom and is laid on top of the grain mass. Obviously, the auger will be inclined upwardly at this point because of the conical configuration of the mass, and it is permitted to assume the inclined position due to the hinge pin 31. The sled member is so oriented that the sled tips 33b are pointed upwardly, that is, with the web portion 33 above the auger.

The motor 22 is then connected with a source of electric power and rotation of the auger about its own axis is a direction to draw material toward the center of the bin is thus commenced. This is the direction of rotation indicated by arrow A in FIG. 1.

Figure 4:
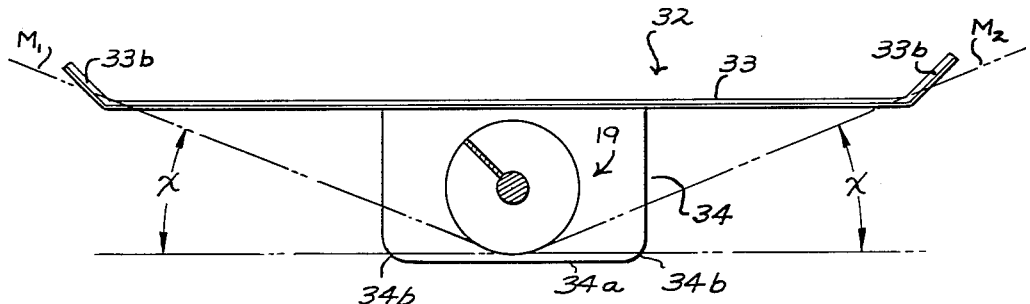
FIG. 4 is an enlarged transverse sectional view through the sweep auger, looking toward the outer end, and schematically showing the relationship of the auger to the grain mass during the initial phase of its operation.

When the auger drive is started, there is a tendency on the part of the auger to immediately dig itself downwardly into the mass of material on which it is resting. Because of the reaction between the auger flighting and the material, and also because of the direction of rotation, there is a concurrent tendency for the auger to commence swinging about its pivot 27 in a clockwise direction, as viewed in FIG. 1. As shown in FIG. 4, the permissible extent of digging is limited by engagement of the outer end sections of sled portion 33 with the material, the slopes on opposite sides of the auger of the material mass being represented by lines M1, M2. A point is reached at which the weight of the auger is supported substantially by the sled-to-material contact. The general angle of the material at this point in the operation is indicated at X in FIG. 4. The approximate configuration of the material relative to the auger can be regarded as a radial trench cut in the upper surface of the grain mass. It will be noted that the tips 33b extend above the lines M1, M2, while their corners are slightly embedded.

As the auger continues rotation about its own axis, its tendency is to swing to the right, as viewed in FIG. 4, and as previously noted. The auger thus continually eats into the slope defined by line M2, and as a result the auger slowly descends in what may best be termed an ever widening trench. An appreciation of this will perhaps be better had from examination of FIG. 5.

Figure 5:
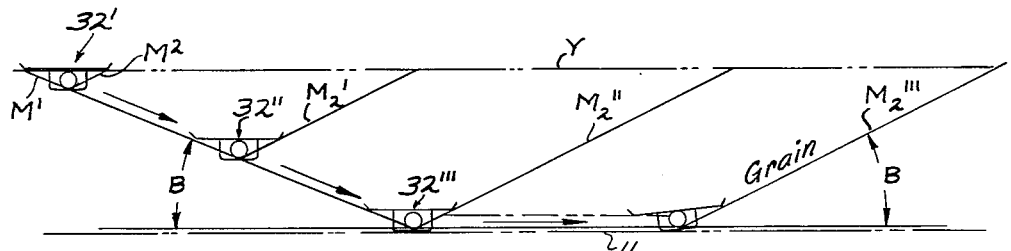
FIG. 5 is a schematic showing illustrating the progress of the sweep auger from starting position in its relationship with the grain mass during subsequent phases of operation.

In FIG. 5 reference numeral 32' indicates the position of the sled and associated end of the auger at the start of operation. Line Y indicates the level of the material adjacent the bin wall. Angle B indicates the angle of repose of the material. After a short period of operation the auger and sled have moved to 32", descending toward the floor at approximately the angle of repose. The material conveyed toward the center by the auger 19 is drawn largely from the mass in the path of the auger, the slope of which is indicated successively at M2', M2" and M2'". Within a short increment of swinging movement, the auger and sled reach position 32''', at which position the lower edge 34a of the sled engages floor 11. From this point in the operation on, the auger sweeps in a horizontal plane around the bin, removing material continuously from the inclined material face or slope in front of it, and progressively discharging it into the center hopper 12 from which it is removed by the subfloor conveyor.

Figure 6:
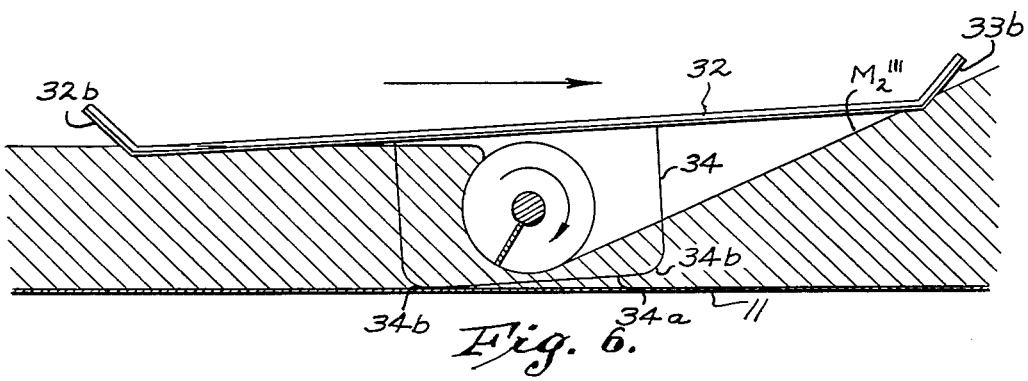
FIG. 6 is a view similar to FIG. 4, but showing the action of the auger during sweep after the auger has reached the floor.

Referring to FIG. 6 which illustrates the auger and sled in operation on the floor, it will be noted that the leading end of the sled works against the sloping face M2" of the material mass. This provides sufficient resistance to sweeping as to cause material to dam up behind the auger and provide a confining force which holds a substantial quantity of material between the flights of the auger. If no resistance were offered, the auger would tend either to sweep too fast or to ride up slope M2'''.

It will be observed that due to engagement of the leading end of the sled with the slope M2''', the sled is tilted slightly and running in contact with the floor only at the rear corner 34b of edge 34a. Frictional contact with the floor is thus minimized and there is little, if anything, to cause the auger to stall.

The unloading of the major portion of the material will be accomplished within one swing of the auger about the bin. A second swing serves to reduce the mass to about one-half the thickness of that shown behind the auger in FIG. 6, which for most commercial purposes is regarded as clean.

It will be apparent that by changing the length and/or width of the sled portion 33, the effective operating depth of the auger relative to the sled can be changed. The longer the portion 33 for any given width, the further out of the material the auger will ride, and the capacity and horsepower requirement will thus be lowered. Conversely, a shorter length results in increased capacity and horsepower required. The exact dimensions to be given the sled will be determined by the weight of the auger, its length and the driving power supplied to the auger.

Because of the fact that the sled is designed so that the web portion 33 overlies active auger flighting, the auger directly sloughs material from under the leading tip and in this fashion permits the auger to descend to the floor in the fashion earlier described. The upturned leading tip 33b prevents the sled from digging too far into the advance, while the frontal area of the tip, acting against the slope provides resistance against too rapid sweeping action.

Figure 7:
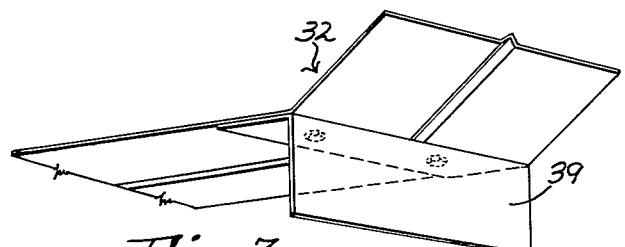
FIG. 7 is a fragmentary perspective view showing the leading end of a modified auger sled having advantages in certain materials.

While with such smooth surfaced particles or grains of relatively large size, such as, for example, corn, the embodiment of the invention hereinbefore described is eminently satisfactory, we have found that in rough husk or hulled grains of smaller particle size (for example, beans and milo), it may be necessary to increase the resistance to sweeping by adding a depending frontal tab 39, as shown in FIG. 7. This tab adds enough frontal area to the sled to compensate for the increased thrust reaction in the auger in such materials, and keep the auger from swinging at a greater rate relative to its rate of descent than is desirable.

In the drawings and description thus far we have shown only a single sled 32 on the auger. For 30 foot lengths and under this has proved satisfactory. However, on longer lengths it is desirable to provide one sled at the midpoint and one at the end. The intermediate sled prevents undesirable bowing of the auger. Obviously where necessary, additional sleds can be provided to compensate for even greater length.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In a sweep auger adapted to swing about a central pivot axis in a storage bin, starting from a rest position on a grain mass, the combination therewith of a sled member connected with the auger for free turning of the auger about its own axis with respect thereto, said sled member including grain mass engaging auger supporting sections spaced laterally from the auger and separated from one another in a direction transverse to the auger axis and of such area as to prevent the auger, when operating on the upper surface of a grain mass, from progressively and completely submerging itself in said grain mass.

2. The combination as in claim 1 wherein at least one of said sections includes a tip bent away from the plane of said section in the direction of the spacing of said section from the auger.

3. The combination as in claim 1 wherein said sections lie substantially in a plane parallel to the axis of said auger.

4. In a sweep auger adapted to sweep about a central pivot axis in a storage bin, the combination therewith of a sled member connected with said auger at a point remote from said pivot axis, said sled member including a connector member extending radially to one side of the auger, bearing means connecting said auger with said connector member for free turning of the auger about tis own axis with respect to the connector member, said sled member further including an auger support portion extending laterally from the outer end of said connector member and spaced radially from the auger, the length of said support portion in a direction transverse to the auger axis being greater than the outside diameter of the auger.

5. The combination as in claim 4 wherein said connector member includes a portion on the opposite side of the auger from said support portion presenting a support surface which is spaced from the auger axis a distance greater than the radius of the auger.

6. The combination as in claim 5 wherein said connector member comprises a substantially rectangular plate disposed normal to the auger axis, said surface being formed by one edge of said plate.

7. The combination as in claim 4 wherein said support portion has a generally rectangular plan, the opposed lengthwise ends of said portion being bent to define oppositely angled tips on that side of the support portion facing away from the auger.

8. The combination as in claim 4 including a resistance tab secured to and extending inwardly from said portion.

9. In a storage bin having a central discharge opening in the bottom thereof and adapted to discharge material from the bin until the material assumes a conical angle of repose, a sweep auger supported with one end adjacent said opening and extending substantially radially outwardly from said opening, means supporting said one end of said sweep auger for sweeping movement of the auger around said opening and for simultaneous swinging of the auger in a vertical plane whereby said auger can be placed on the conical surface of said material, means for rotating the auger about its own axis in a direction to cause the auger to draw material toward said opening, and support means connected with the auger at a point remote from said one end, said support means rotatably connected with the auger and including grain contacting surfaces of substantial area on opposite sides of the auger axis, the area and location of said surfaces such as to cause said auger, upon rotation about its own axis, to swing around said bin in a controlled descent path combining swinging and descending movement of the auger and producing an ever-widening trench in the material with the auger at the vertex thereof until the auger reaches the bin bottom.

10. The combination as in claim 9 wherein said support means is effective to control the angle of descent to an angle greater than the natural angle of repose of the material.

References Cited in the file of this patent

UNITED STATES PATENTS 2,711,814     McCarthy _____ June 28, 1955